Jan. 5, 1943.   F. P. MANSBENDEL   2,307,695
WEIGHT TESTING MACHINE
Filed July 5, 1940   8 Sheets-Sheet 1
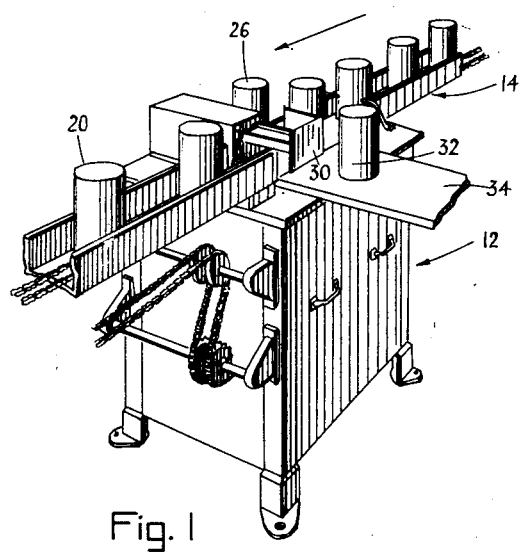
Fig. 1
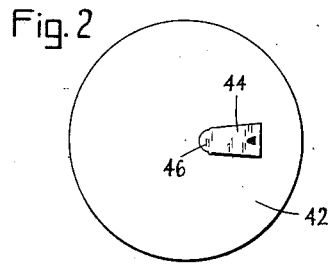
Fig. 2
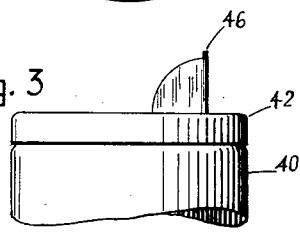
Fig. 3
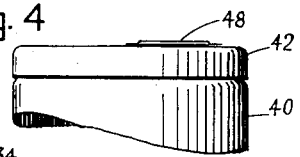
Fig. 4
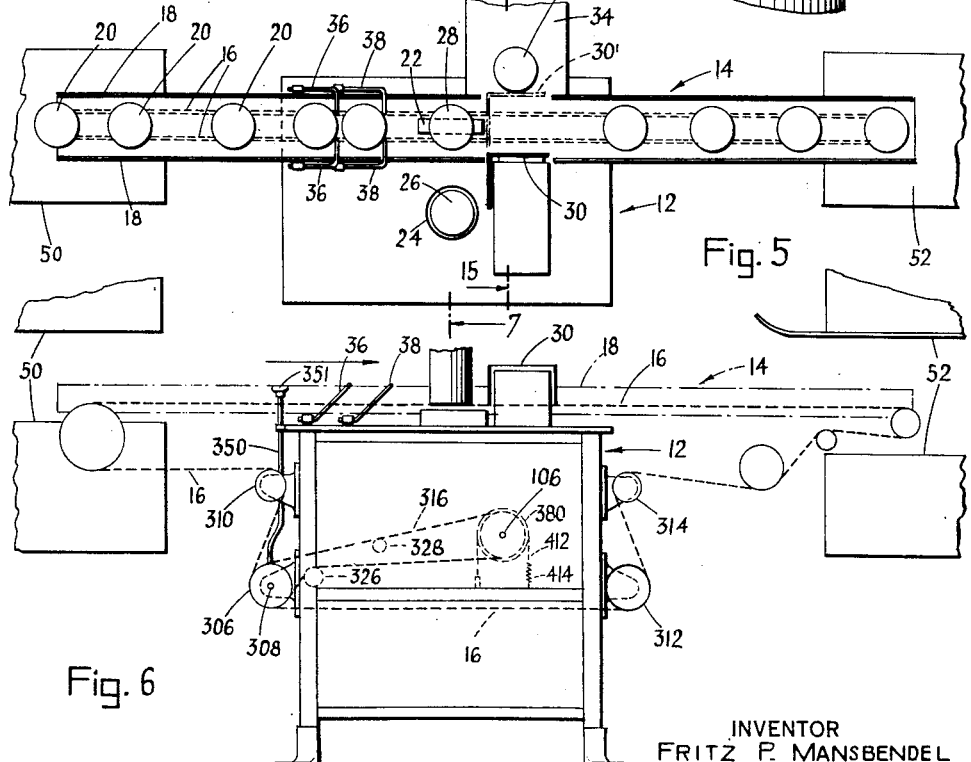
Fig. 5
Fig. 6
INVENTOR
FRITZ P. MANSBENDEL
BY James & Franklin
ATTORNEYS Jan. 5, 1943.  F. P. MANSBENDEL  2,307,695
WEIGHT TESTING MACHINE
Filed July 5, 1940  8 Sheets-Sheet 2
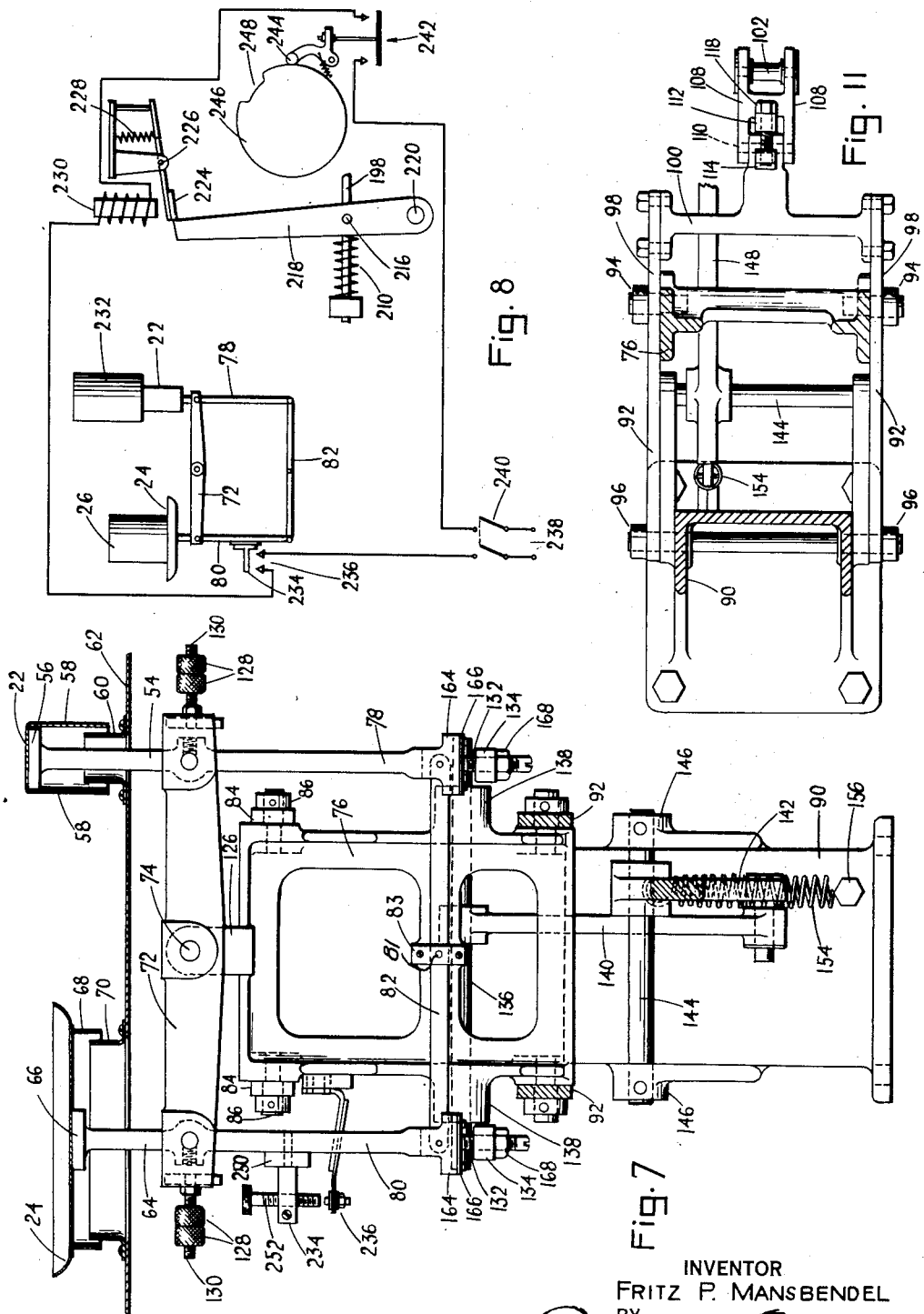
INVENTOR
FRITZ P. MANSBENDEL
BY
James + Franklin
ATTORNEYS

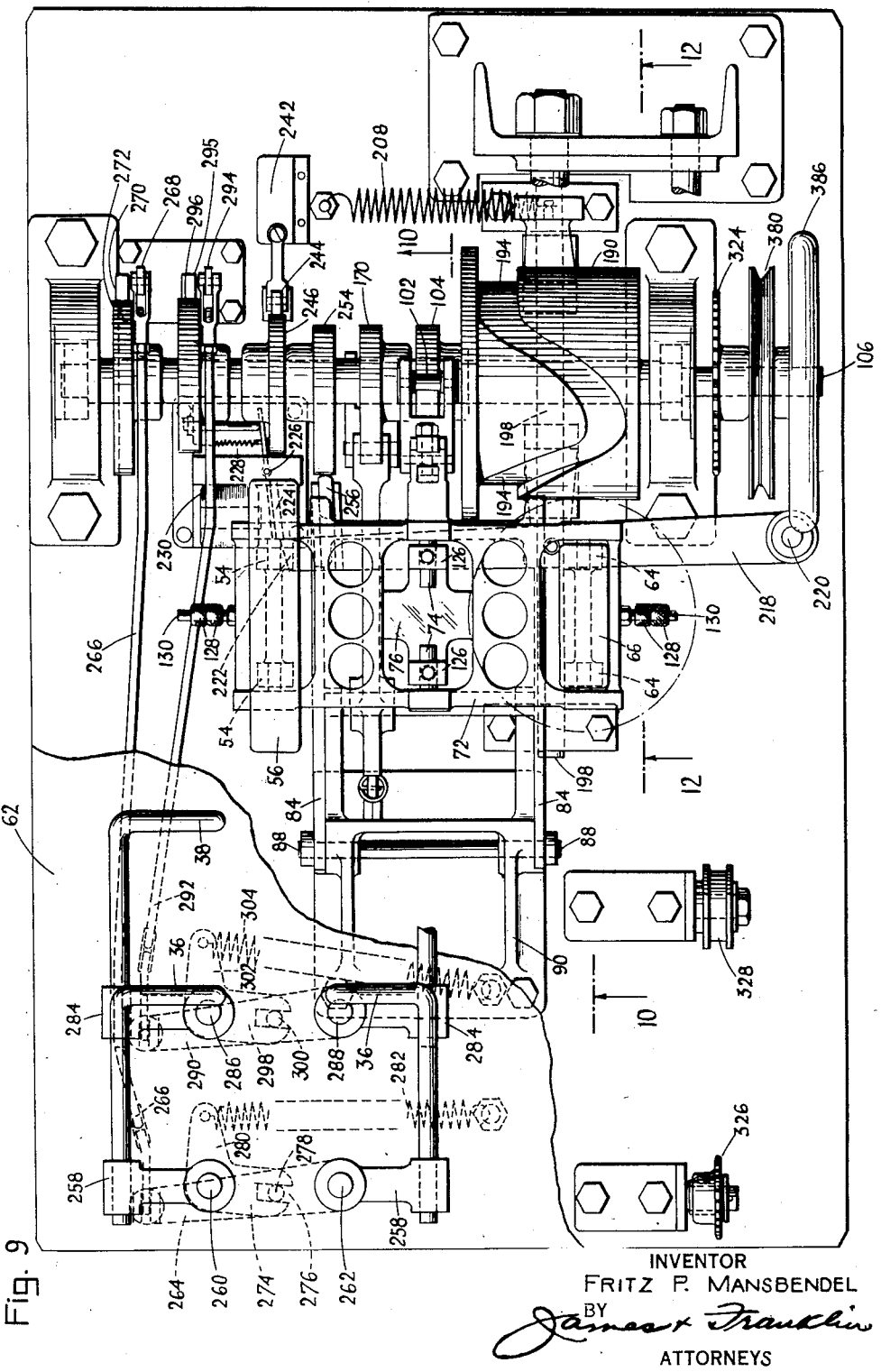

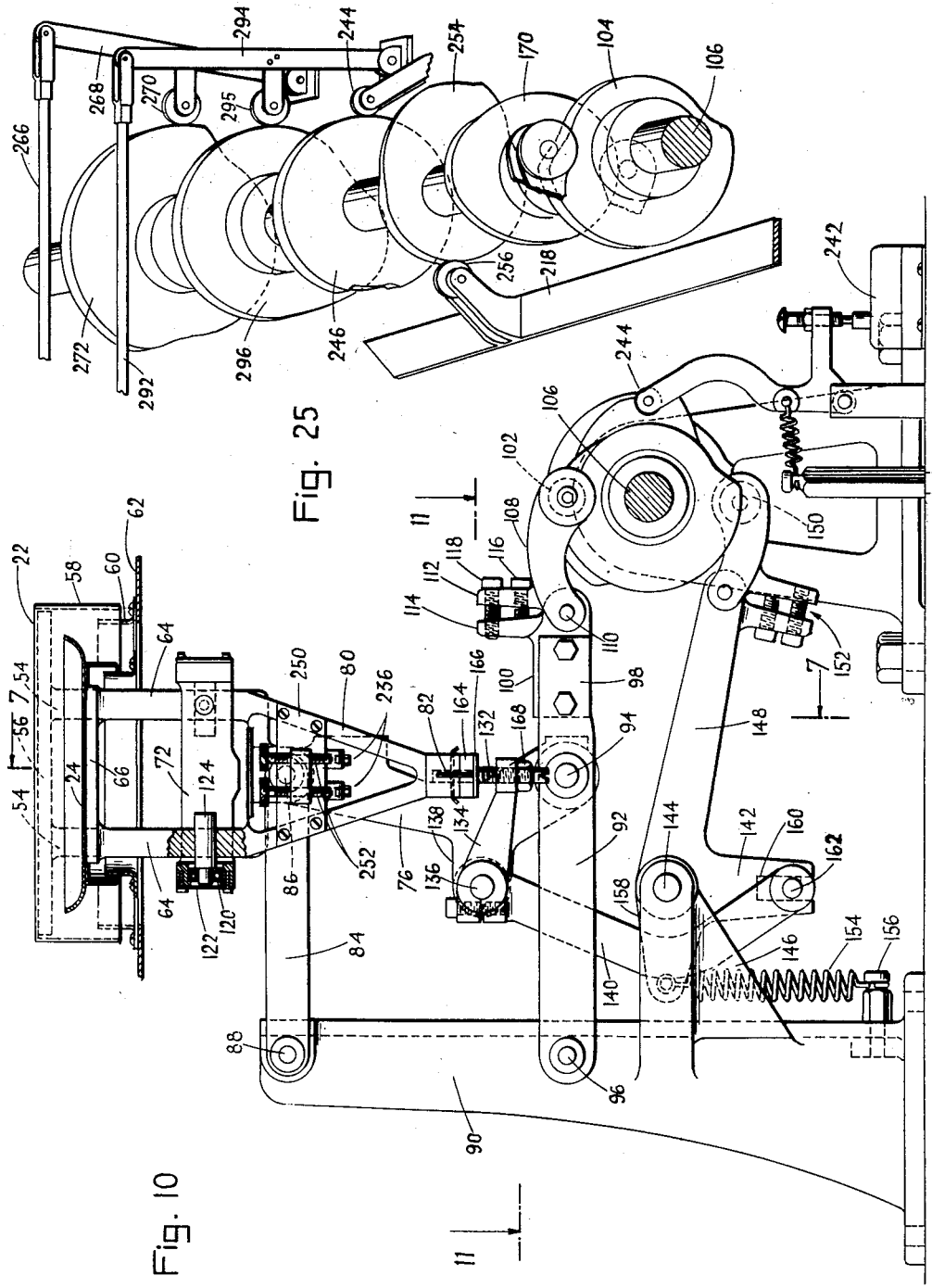

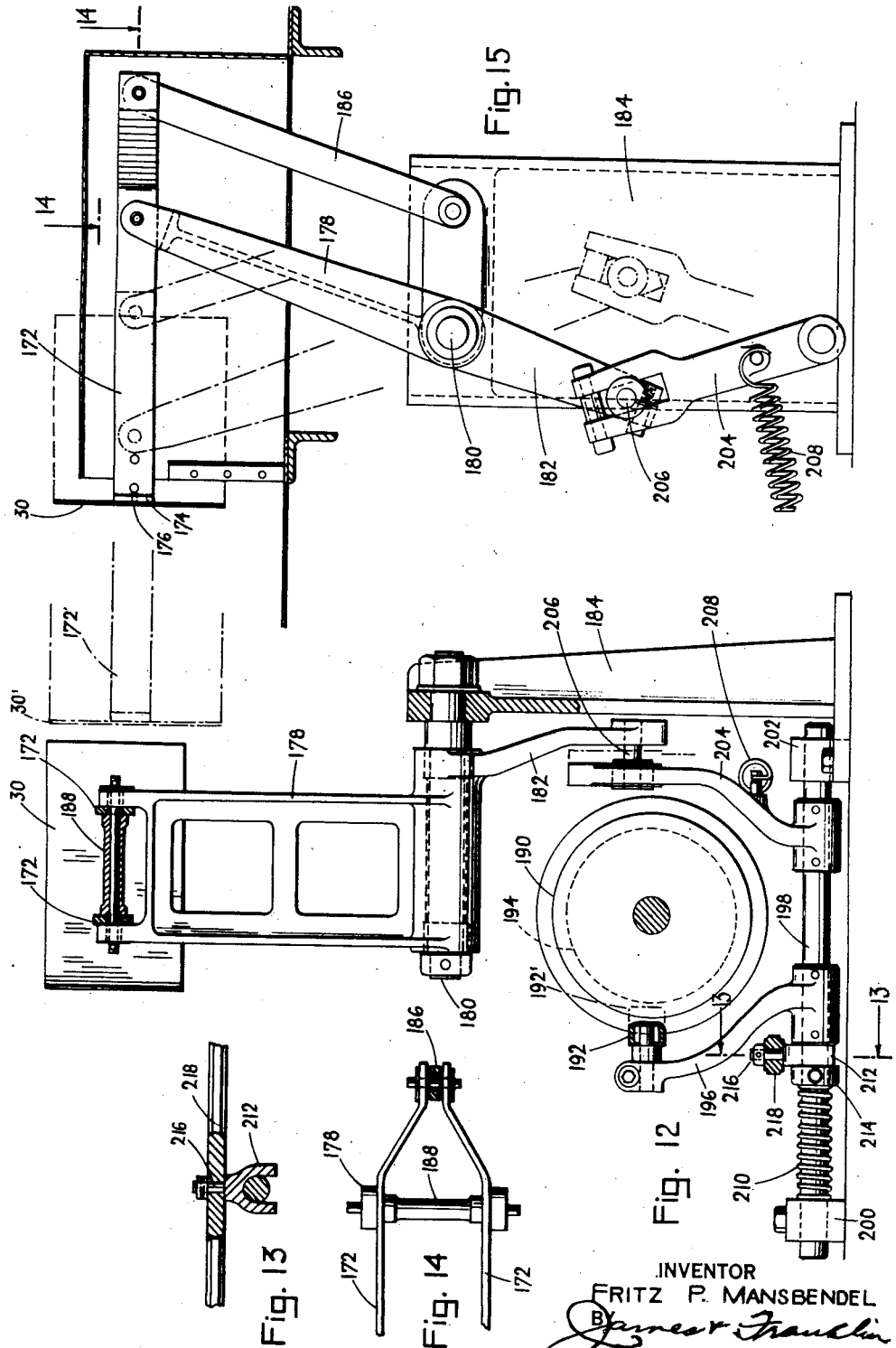

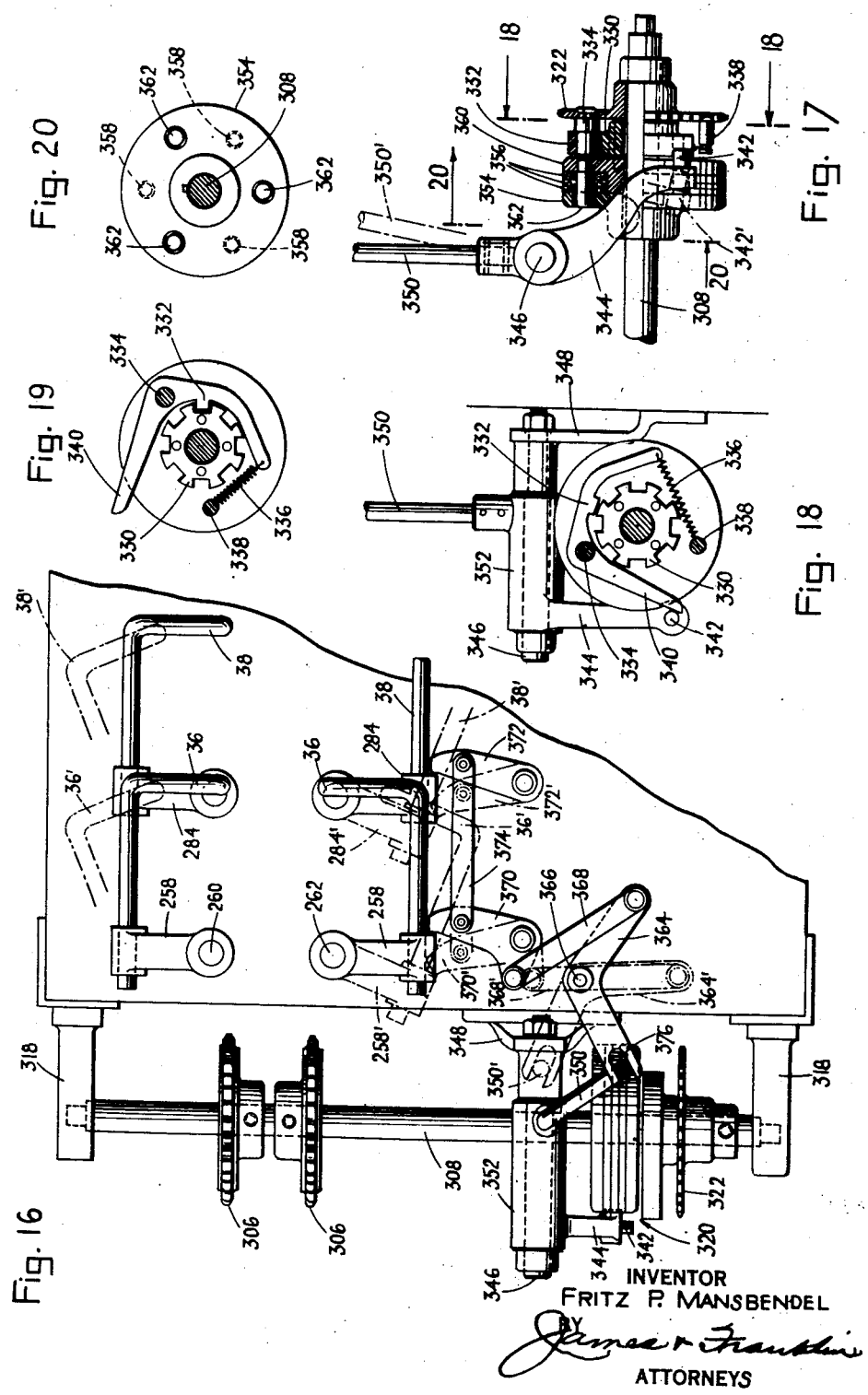

Jan. 5, 1943.  F. P. MANSBENDEL  2,307,695
WEIGHT TESTING MACHINE
Filed July 5, 1940  8 Sheets-Sheet 7
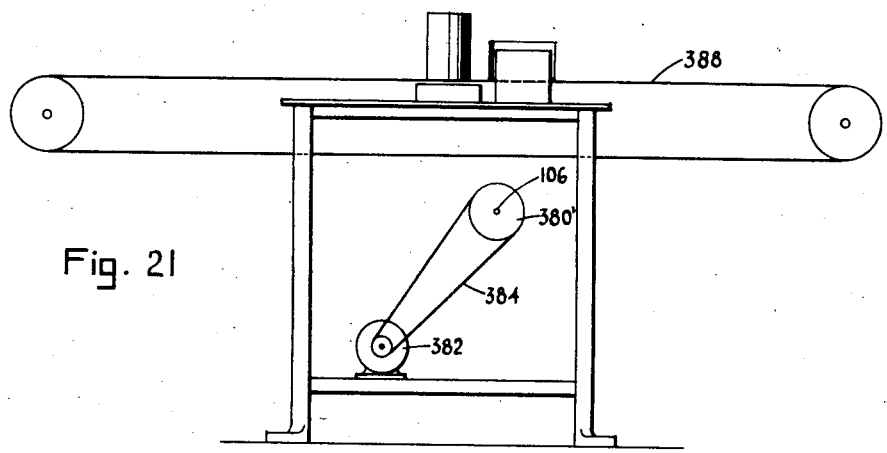
Fig. 21
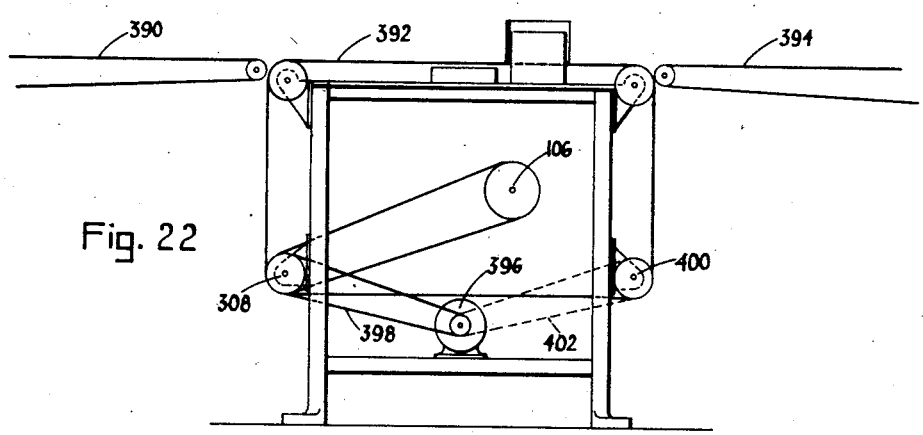
Fig. 22
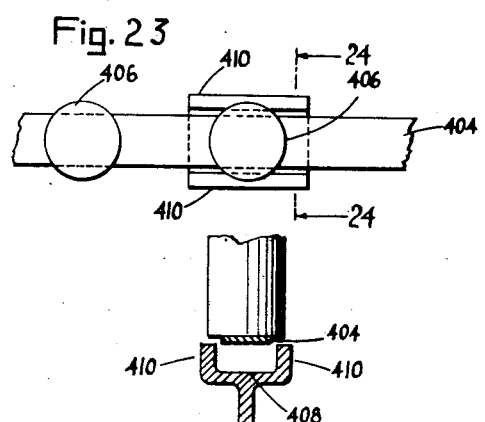
Fig. 23
Fig. 24
INVENTOR
FRITZ P. MANSBENDEL
BY James + Franklin
ATTORNEYS Jan. 5, 1943.     F. P. MANSBENDEL     2,307,695
WEIGHT TESTING MACHINE
Filed July 5, 1940     8 Sheets-Sheet 8
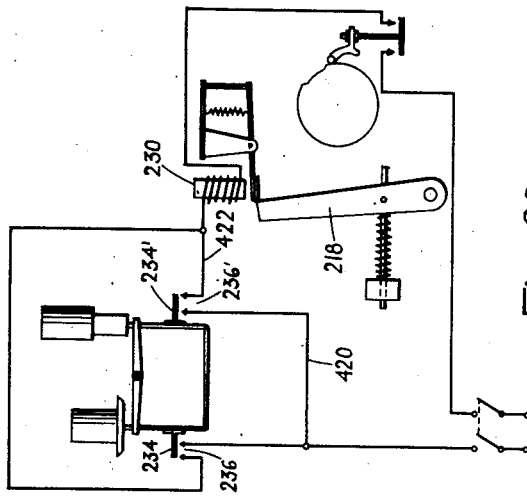
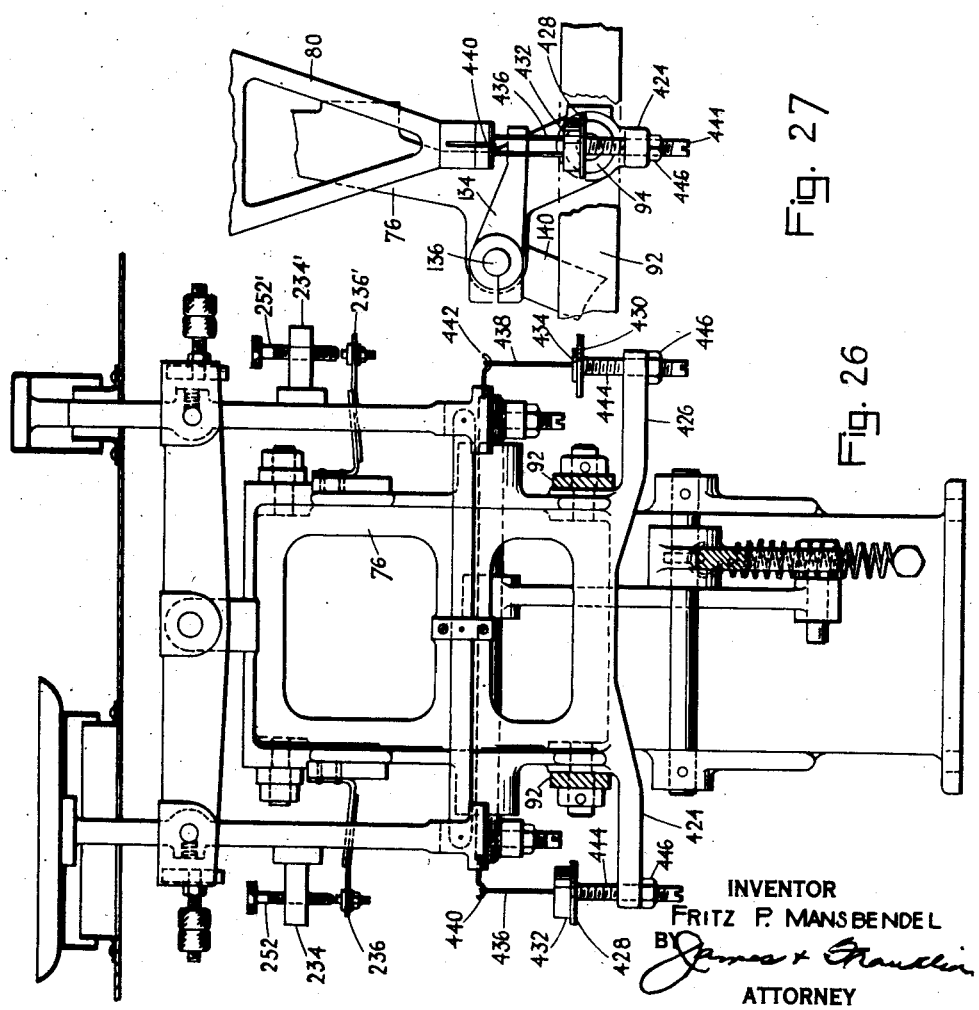
INVENTOR
FRITZ P. MANSBENDEL
BY
ATTORNEY Patented Jan. 5, 1943

2,307,695

UNITED STATES PATENT OFFICE 2,307,695

WEIGHT TESTING MACHINE

Fritz P. Mansbendel, Brooklyn, N. Y., assignor to The Fred Goat Co., Inc., Brooklyn, N. Y., a corporation of New York Application July 5, 1940, Serial No. 344,051

34 Claims. (Cl. 209—121)

This invention relates to weight testing machines, and more particularly to a high speed underweight or/and overweight ejector.

The primary object of my invention is to generally improve machines of the specified character. A more particular object is to provide such a machine which may be applied to or combined with a continuously moving conveyor with little or no change in the conveyor system. Still another object is to design apparatus for the specified purpose which will operate at relatively high rates of speed so that it may be combined with high speed package-filling machinery without intermediate storage. Still another object is to provide weight testing apparatus which will not change the orientation of the packages being weighed. This is important when dealing with a package having a pouring spout or other filling opening which is unsymmetrically located on the package. The package is preferably weighed between the filling and sealing operations so that underweight packages may be ejected before they are sealed, and thus corrected by the addition of more of the substance being packaged. For this purpose, however, the orientation of the package must not be changed between the filling machine and the sealing machine.

Further objects are to insure synchronism between the operation of the conveyor and the operation of the weight testing machine; to dispense in many instances with the need for a special driving motor for the weight-testing machine; to insure proper placement of the packages on the load pan of the scale despite irregularity in the delivery of packages to the conveyor; and to provide means whereby the weight testing apparatus may be made inoperative without interrupting the continued operation of the conveyor.

To the accomplishment of the foregoing and other objects which will hereinafter appear, my invention consists in the weight testing and package ejecting elements, and their relation one to the other, as hereinafter are more particularly described in the specification and sought to be defined in the claims. The specification is accompanied by drawings in which:

Fig. 1 is a perspective view illustrating one form of my improved weight testing apparatus in action;

Fig. 2 is a plan view of one example of a package the orientation of which is preferably maintained unchanged;

Fig. 3 is a side elevation of the same with the filling and pouring spout open;

Fig. 4 is a side elevation of the same with the spout closed and sealed;

Fig. 5 is a schematic plan view of the weight testing apparatus disposed between a filling machine and a sealing machine;

Fig. 6 is a schematic side elevation of the same;

Fig. 7 is a section through the scale, taken approximately in the plane of the line 7—7 of Figs. 5 and 10;

Fig. 8 is a schematic wiring diagram explanatory of the operation of the machine;

Fig. 9 is a plan view of the machine with most of the cover or top plate of the machine cut away;

Fig. 10 is a partially sectioned end elevation of the scale and the lifting mechanism therefor;

Fig. 11 is a horizontal section showing the lifting mechanism, and being taken approximately in the plane of the line 11—11 of Fig. 10;

Fig. 12 is a partially sectioned view through the ejecting mechanism taken on the plane of the line 12—12 of Fig. 9;

Fig. 13 is a section taken in the plane of the line 13—13 of Fig. 12;

Fig. 14 is a partially sectioned plan view approximately in the plane of the line 14—14 of Fig. 15;

Fig. 15 is a transverse section through the apparatus at the ejector mechanism, and is taken approximately in the plane of the line 15—15 of Fig. 5;

Fig. 16 is a plan view of the clutch and package placement mechanism;

Fig. 17 is a partially sectioned elevation of the clutch;

Fig. 18 is a transverse section taken in the plane of the line 18—18 of Fig. 17;

Fig. 19 is a view similar to Fig. 17, but showing the clutch in engaged relation;

Fig. 20 is a section taken in the plane of the line 20—20 of Fig. 17;

Fig. 21 is a schematic diagram of a modification using a motor for driving the weight testing apparatus independently of the conveyor;

Fig. 22 is a schematic diagram for a weight testing apparatus in which the packages are moved to and from the weight testing apparatus by independent conveyors;

Fig. 23 is a schematic plan view illustrating a modified load pan which straddles the conveyor;

Fig. 24 is a section taken in the plane of the line 24—24 of Fig. 23.

Fig. 25 is an isometric view schematically showing most of the cam shaft.

Fig. 26 is a view similar to Fig. 7, but showing a modification for overweight and underweight, with tolerance adjustment;

Fig. 27 is a fragmentary side elevation, like Fig. 10, but showing the modification; and Fig. 28 is a wiring diagram for the modification.

Referring to the drawings, and more particularly to Figs. 1, 5 and 6, the weight testing apparatus, generally designated 12, is disposed beneath a suitable conveyor generally designated 14. The conveyor preferably consists of spaced collateral chains 16 which are moved in unison between appropriate guide walls 18 and which carry the objects or packages 20 which are to be tested. The scale comprises a load pan 22, and a standard weight pan 24. This may be loaded with suitable weights, or, as here shown, with a package 26 of correct weight. The standard weight pan 24 and standard package 26 are omitted in Fig. 6. The load pan 22 is a rather long narrow member dimensioned to fit between the chains 16. It has no upwardly turned edges or flange, and therefore is not a "pan" in conventional sense, but it is convenient to refer to the same as such because it functions like a scale pan during the weight testing operation.

The entire scale is bodily lifted at periodic intervals in order to raise the load pan 22 from a position beneath the conveyor chains 16 to a position above the chains. This is done at a time when a package 28 moving along with the conveyor is disposed directly over the load pan. As the scale is raised, the load pan lifts the package from the conveyor chains long enough for the desired weight testing operation. Then the scale is lowered to replace the package on the chains.

In the present case the machine is designed to eject only underweight packages. For this purpose, the machine is provided with a pusher or ejector 30 normally disposed at one side of the conveyor, as is shown in solid lines in Fig. 5. An underweight package is slid sidewardly off the conveyor by movement of the ejector from the solid line position 30 to the broken line position 30' in Fig. 5. The underweight package 32 is thereby deposited on a suitable surface or table 34, or a chute, if preferred. The ejected position of pusher 30 and package 32 is also shown in Fig. 1. It may be mentioned that the ejector station is preferably located at a point following the weight testing station in order that the time required for the complete weight testing and ejecting cycle may be minimized. In other words, the speed of the machine as here designed depends on the weight testing time alone, and no additional time need be allowed for ejection. Viewing the matter from a different aspect, and assuming a certain speed of operation must be met, the ejection at a later point is employed in order that the time required for weighing need not be minimized. In other words, during one cycle of the testing period, the time allowed for actual weighing is made as long as possible to insure accurate results, requiring that the package be released from the scale pan the instant the weighing operation is completed, so that the next package may find the scale pan unobstructed. For this reason the actual ejection takes place after the package has left the scale, that is, after the weighing operation, and sometimes later in the cycle. The machine, of course, is so timed that an underweight package is not ejected until after it has been returned to the conveyor and moved to the ejector.

Inasmuch as the packages 20 may be delivered to the conveyor chains 16 in somewhat irregular fashion, I prefer to provide suitable means for properly spacing the packages and insuring their correct placement on the load pan of the scale. As here illustrated, I provide stop fingers 36 (Fig. 5) and placement fingers 38. These fingers may be moved inwardly to the position shown in solid lines in Figs. 5 and 15, or may be moved outwardly to the position shown in broken lines in Fig. 15. By using two pairs of fingers the movement of the packages on the conveyor approaching the machine need not be critical in timing. The stop fingers 36 may be normally closed, and then opened only while the placement fingers 38 are closed, and the latter may be opened just in time to insure proper placement of the package over the approximate center of the load pan 22 when the latter has been raised enough to lift the package.

Attention is now directed to Figs. 2, 3 and 4. These show a known form of container such as is used for granulated substances, for example, salt. The container comprises a cylindrical body 40 closed by a cap 42, the latter being provided with a small pouring spout 44 pivoted at one end and provided with a tab 46 at the opposite end. The spout may normally be turned down to the closed position shown in Figs. 2 and 4, but may be lifted to the open position shown in Fig. 3 when some of the contents is to be poured from the container. This type of package is frequently filled through the pouring spout, the latter then being in the open position shown in Fig. 3. Thereafter, the spout is turned down, and the sealing disc 48 (Fig. 4) is cemented thereover, this disc being made, for example, of Cellophane, waxed paper, or the like.

It is evident that the most convenient time to check the weight of such a container is between the filling and cementing operations, for if the package is underweight, some additional material may be poured through the open spout to correct the underweight condition, without the trouble and waste of removing the cemented seal 48. Thus, in Figs. 5 and 6, the underweight ejecting apparatus 12 is shown located between a filling machine generally designated 50, and a sealing machine generally designated 52. The ability to so locate the underweight ejector 12 is one of the important advantages of the present apparatus, for it does not change the orientation of the packages between the filling machine and the sealing machine. In fact, the packages may be and are preferably moved through all three machines by the same conveyor chains 16. There is no change in orientation at the scale, for the load pan simply lifts and then replaces the package gently without rotation. It is essential to maintain the orientation of the package for successful functioning of the sealing machine, because the pouring spout is located near one edge rather than at the center of the package.

The scale and lift mechanism

Referring now to Figs. 7, 9 and 10, the load pan 22 is mounted on a support comprising uprights 54 joined by an integrally cast horizontal member 56. The pan 22 is preferably provided with a depending skirt 58 surrounding an upstanding flange 60 on the top 62 of the machine. This prevents the settling of dust into the casing, which is otherwise fully enclosed in order to protect the scale mechanism. The standard weight pan 24 is similarly mounted on vertical supports 64 joined by an integrally cast horizontal member 66. The pan 24 is provided with a dust skirt 68 surrounding an upstanding flange 70 on top 62. The uprights 54 and 64 are pivotally mounted on a scale beam 72 fulcrumed at 74 on a generally upright support frame 76. The scale beam 72 is itself a framelike member, as will be best seen in Fig. 9. It may be mentioned that in Fig. 9 the pans 22 and 24 as well as most of the top 62, have been removed.

The uprights 54 and 64 are projected downwardly to form a part of a parallel motion linkage. For this purpose, the downward extensions 78 and 80 are pivotally joined by a link 82. The general nature of the arrangement will be clear from inspection of Fig. 8, showing how the extensions 78 and 80 beneath scale beam 72 are joined by link 82. But link 82 may also be pivoted, as by means of a pin 81 (Fig. 7) passing through a plate 83 screwed on the scale support frame 76.

The scale is periodically bodily lifted by raising the support frame 76 previously referred to. For this purpose, frame 76 is mounted on four arms forming a parallel motion linkage for maintaining frame 76 in vertical position when it is lifted. The amount of movement is very small compared to the length of the links, and there is accordingly no appreciable sideward displacement of the scale. Referring to the drawings, there is a pair of upper links 84 (Figs. 9 and 10), the movable ends of which are pivotally connected at 86 to the upper corners of frame 76, and the opposite ends of which are pivotally connected at 88 to a stationary pedestal 90. Referring now to Figs. 10 and 11, the frame 76 is additionally supported by arms 92 which are pivotally connected to the lower corners of frame 76 at 94 and to the pedestal 90 at 96. The lower arms 92 are longer than the upper arms 84, the extensions 98 thereof being bolted to a bridge 100 extending therebetween, said bridge carrying a cam follower roller 102 which rests on a lift cam 104 (Figs. 9 and 25) carried by the main cam shaft 106. The position of cam follower roller 102 relative to the arms 92 may be varied by an adjustable mounting, best shown in Fig. 10. For this purpose the follower 102 is carried between arms 108 pivoted at 110 and provided with a rigidly upstanding finger 112. The bridge 100 is provided with a similar rigidly upstanding finger 114. The fingers are locked in desired relative position by means of a push screw 116 and a pull screw 118. Thus, to raise the roller, the screw 116 is backed away and screw 118 is tightened, and conversely, to lower the roller, screw 118 is backed away and screw 116 is tightened.

Because of the rapid operation of the machine, and because the scale is bodily raised and lowered at considerable speed, I find that it is not feasible nor desirable to use conventional scale pivots or stones for the scale. Instead, I employ comparatively tiny sensitive anti-friction bearings, preferably ball bearings, one of which is clearly shown at 120 in Fig. 10. The outside of the bearing is sealed by a cover plate 122. The bearing is carried on the shouldered outer end of a pin 124 which is driven through upright 64 with a force-fit, and forms a part of the upright. Similar ball bearings are preferably employed for the support of the load pan 22, and also for the support of the scale beam on the frame. In the case of the scale beam, the pins 74 are fixedly secured in upstanding lugs 126 on the frame, as is best shown in Figs. 7 and 9.

The scale may be initially balanced by means of adjusting weights in the form of knurled pairs of nuts 128 threadedly received on screws 130 projecting from the ends of the beam, as is best shown in Figs. 7 and 9.

It may be pointed out that the scale has no self-restoring force, that is, there is no attempt to provide the same with a low center of gravity so as to gravitationally seek its balance position. It is restored to balance position after each weighing operation by the return action of the scale lock fingers subsequently described. The advantage of this is in reducing the mass of the scale and thereby speeding up the weighing action of the same.

Scale release mechanism

The scale is normally held against tilting by lock mechanism, the latter being released at the moment the weight of the package is to be tested. Referring to Figs. 7 and 10 of the drawings, the lock mechanism comprises lock fingers or screws 132 carried on arms 134 which are themselves mounted on a shaft 136 extending parallel to frame 76 and carried in bearings 138 formed integrally with frame 76. The arms 134 are mounted on the ends of shaft 136 outside the bearings 138. At an intermediate point between bearings 138 the shaft 136 carries a depending release arm 140. The lower end of this arm is coupled to the downwardly extending arm 142 of an angle lever pivotally carried on a shaft 144, the latter being itself mounted on bearings 146 projecting from the pedestal 90. The other arm 148 of the angle lever acts as a cam follower arm adjustably carrying a cam follower roller 150, the adjusting mechanism generally designated 152 being similar to that previously described for the follower roller 102. The arm 148 is normally urged upwardly by means of a pull spring 154, the lower end of which is connected to pedestal 90 at 156, and the upper end of which is connected to an arm 158 formed integrally with the angle lever or otherwise connected thereto.

The connection between the release arm 140 and the cam follower arm preferably includes a lost-motion device to permit lifting of the scale without affecting the position of the scale lock mechanism. In other words, the timing of the scale release movement should preferably be wholly independent of the timing of the scale lift movement. In the present case, the desired result is obtained in a simple manner by coupling the release arm 140 to the cam follower arm by means of a vertical slot 160, best shown in Fig. 10. It will be evident that the pin 162 of release arm 140 is vertically movable in slot 160 without producing any oscillation of release arm 140. Thus, when the scale is bodily lifted by means of the arms 92, the rise of scale support frame 76 is accompanied by a rise in the position of release arm 140, but there being no oscillation of arm 140, the lock fingers 132 remain unchanged in position, thereby preventing premature release of the scale.

Referring now to Fig. 7 and 10, the lock fingers 132 are preferably in the form of screws which are adjusted to bear against the preferably enlarged lower ends 164 at the bottom of the uprights of the scale. These uprights converge in V-shape to meet at the enlarged ends 164. To avoid wear, the bottom surfaces are preferably faced with plates 166 of hardened steel. The adjustment of screws 132 may be locked by means of nuts 168. The adjustment is, of course, so made as to normally prevent oscillation or tilting of the scale. When, however, the scale release cam (shown at 170 in Figs. 9 and 25) moves the cam follower 150 downwardly, the arms 148, 142, 140 and 134 are all turned clockwise as viewed in Fig. 10, thereby lowering the stop screws 132 and so permitting free tilting of the scale. The scale is released long enough for the weight testing operation, as is explained in greater detail later. The operating cycle of the machine is subdivided for most efficient use of the comparatively small amount of available time. It goes without saying that the scale release occurs immediately following the rise of the scale, and that the duration of scale release takes place during the latter part of the time during which the scale is elevated.

The scale release movement preferably takes place at the rate governed by considerations of acceleration, as is explained and taught more fully in my Patent No. 2,197,381.

Ejector mechanism

The ejector has already been referred to at the numeral 30 in Figs. 1, 5 and 6. Referring now to Figs. 12 through 15, the ejector plate 30 is carried at the forward end of a pair of arms 172 the forward ends of which are bent at 174 and riveted or otherwise secured to plate 30 at 176. The arms 172 are carried at the upper end of a lever 178 pivoted, at 180. The broad configuration of lever 178 is best shown in Fig. 12, which also shows the manner in which the depending part 182 of the lever is formed integrally but in offset relation thereto. The bearing 180 is carried at the upper end of a suitable pedestal 184. Arms 172 are further supported by a link 186 which insures parallel motion of arms 172. The latter are held apart by a spacer 188 (Figs. 12 and 14) at the upper end of lever 178, but are bent together at the link 186, as is best shown in Fig. 14.

It will be evident that counterclockwise oscillation of lever 178 (Fig. 15) will cause the linkage and the pusher 30 to move from the solid line position to the broken line position, thereby ejecting a package transversely off the conveyor. The movement of lever 178 is produced by a cylindrical cam or barrel cam 190 (Figs. 9 and 12) operating on a cam follower 192 (Fig. 12) which is normally retracted from the cam groove 194, as is shown in solid lines in Fig. 12. The ejector is therefore normally inoperative. When, however, the cam follower roller 192 is moved to the broken line position 192', it is then received in the cam groove 194, and the ejector is operated.

Cam follower 192 is carried at the upper end of an arm 196 carried on an oscillatable and axially reciprocable shaft 198 received in bearings 200 and 202. Shaft 198 carries an arm 204 the upper end of which is articulated to arm 182 by means of a pin 206 which slidably accommodates the axial movement of shaft 198. The ejector is normally held in retracted position by a tensioned spring 208 (Figs. 9 and 15). The cam follower 192 is normally urged into operative position by a compression spring 210 (Fig. 12) coiled about shaft 198. However, it is held in retracted position by appropriate latch mechanism next described.

Referring to Figs. 12 and 13, a yoke 212 surrounds shaft 198 ahead of a collar 214 secured to the shaft. The yoke 212 is pivotally connected at 216 to a latch arm 218 which extends transversely of shaft 198 immediately thereabove.

Referring now to Fig. 9, one end of the latch arm 218 is pivoted at 220. An intermediate part of the latch arm carries the yoke which engages the axially reciprocable shaft 198, but this point of connection is not clear in Fig. 9, it being concealed by parts of the scale thereabove. The opposite end 222 of latch arm 218 abuts against a latch detent 224, thereby holding the arm in retracted position. The detent is pivoted at 226 and is normally urged into locking position by a pull spring 228. However, the detent is provided with a magnet armature disposed near a magnet 230 which when energized, moves the detent and so releases the latch arm, thereby permitting the cam follower to engage the cylinder cam with resulting operation of the ejector.

These parts are more clearly shown, and the operation will be more readily understood, by reference to Fig. 8 showing the latch arm 218 pivoted at 220 and carrying a yoke at 216 for restraining the axially movable shaft 198 against the action of compression spring 210. The latch arm 218 is held in retracted position by detent 224 pivoted at 226 and normally held in locking position by spring 228. When, however, the magnet 230 is energized, it attracts the detent 224, thereby releasing latch arm 218 and permitting spring 210 to expand.

Magnet 230 is energized only in the event of unbalance of the scale, or in the specific case here shown, in the event of an underweight package 232 on load pan 22. With an underweight package, the standard weight 26 falls, thereby causing a conductive member or bridge 234 on the scale to engage a pair of contacts 236 arranged in the circuit of magnet 230. Energy is supplied from an outside source at 238, which may be connected to an ordinary light or power line. The master switch 240 is, of course, normally closed during operation of the machine.

In order to exactly time the operation of the ejector relative to the complete cycle of the machine, and irrespective of whether the underweight of the package is large or small, I prefer to provide an additional timing switch generally designated 242 in series with magnet circuit 230. This switch is controlled by a cam follower 244 cooperating with a cam 246 carried by the main cam shaft of the machine. It will be understood that the contacts of switch 242 are closed only at the instant that the cam depression 248 reaches cam follower 244. This, of course, takes place at the end of the weighing period, so that the release of the latch arm operates at its proper time in the cycle.

Referring now to Figs. 9 and 25, the cam 246 is shown cooperating with cam follower 244, which in turn acts upon a switch housed at 242 (Fig. 9).

The scale contacts 234 and 236 are shown in greater detail in Figs. 7 and 10 of the drawings. It will there be seen that the contacts 236 are mounted on springs carried by the scale support frame 76. The metallic bridge 234 is preferably insulatedly mounted on a plate 250 extending across the scale upright 80. The bridge 234 is preferably provided with adjusting screws 252 so that the gap at the contacts may be accurately adjusted. I find that it is not safe to use a gap less than, say, one millimeter, thus necessitating a scale movement of a millimeter in order to determine the presence of an underweight package.

After each operation of the ejector, the latch and detent are restored to retracted or locked position, thus preventing further operation of the ejector until another underweight package is detected. Referring to Figs. 9 and 25, I provide a restoring cam or latching cam 254 which operates on a cam follower 256 connected to the latch arm 218. It will be understood that the moment the latch arm is moved back, the detent 224 (Fig. 8) is moved into holding position by its spring 248, for the magnet 230 has meanwhile been deenergized.

The entire operating cycle is completed in the course of one revolution of the cam shaft. The ejection of an underweight container at a station beyond the scale instead of at the scale conserves time and so speeds up the operation of the machine, for the reason that the underweight container is moved off the scale and thereby clears the same to receive the next approaching container to be weighed. In other words, the scale is receiving the next container while the preceding container, if underweight, is being ejected. Two containers are being operated upon simultaneously during a part of the rotation of the cam shaft. If by the term "cycle" we refer to the cycle of treatment of any one container, instead of a rotation of the cam shaft, then the cycle of one container overlaps the cycle of the next succeeding container, thereby conserving time in the operation of the machine.

Placement mechanism

It has already been mentioned in connection with Figs. 1 and 5 that the machine is preferably provided with placement mechanism to periodically release one of the packages in proper synchronism with the lifting of the scale, to insure accurate placement of the package over the load pan 22 when the scale rises. While not essential, I prefer to use two separate means for this purpose, specifically, the stop fingers 36 and the placement fingers 38, the stop fingers releasing one package at a time to the placement fingers, and the latter accurately timing the release of the package to the load pan.

The mechanism for operating the stop and placement fingers may be described with reference to Fig. 9. Stop fingers 36 are mounted on arms 258 carried at the upper ends of vertical pins 260 and 262. Fingers 36 and arms 258 are disposed above the top 62 of the machine. The pins pass through the top, and the lower end of pin 262 carries an arm 264 the end of which is connected by means of a rod 266 (Figs. 9 and 25) to a generally upright arm 268 carrying a cam follower 270 engaging a stop finger cam 272. The lower end of pin 260 (Fig. 9) carries an arm 274 having a slotted end 276 receiving a pin 278 on arm 264. The pin 278 is located half-way between pins 260 and 262. It will be evident that with this arrangement, the stop fingers are moved equally and oppositely. The arm 274 preferably forms one part of an angle lever the other arm 280 of which is acted upon by a pull spring 282 which normally holds the stop fingers in the package-stopping position shown in solid lines in Fig. 9. In Fig. 16 the spread or released position 36' of the stop fingers is shown in broken lines.

The operating mechanism for the placement fingers 38 is substantially the same as that for the stop fingers. The fingers 38 are carried on arms 284 (Fig. 9) mounted on vertical pins 286 and 288. Pin 288 carries arm 290, the free end of which is connected by a link 292 (Figs. 9 and 25) to a generally upright lever 294 carrying a cam follower roller 295 cooperating with cam 296 on the main cam shaft. The pin 286 (Fig. 9) carries an angle lever, arm 298 of which receives a pin 300 mounted on arm 290 mid-way between pins 286 and 288. The arm 302 is acted upon by a pull spring 304, urging the placement fingers 38 into package-restraining position.

Clutch and drive mechanism

The machine as here described is not provided with a separate driving motor. The machine is assumed to be combined with a conveyor chain in operation between other machines, such as the filling machine 50 and sealing machine 52 mentioned in connection with Figs. 5 and 6 of the drawings. In such case, the weight testing machine may be driven by the conveyor chain itself, and this has the advantage not only of eliminating a special motor, but also of maintaining absolute synchronism in the operation of the conveyor chain and the weight testing machine. Thus, referring to Fig. 6, the conveyor chains 16 are led around sprockets 306 carried on a clutch shaft 308. Appropriate guide wheels 310, 312 and 314 may be provided to lead the conveyor chains around sprockets 306. The clutch shaft 308, through appropriate clutch means and a local drive chain 316, may be used to drive the main cam shaft 106 of the machine. Referring now to Fig. 16, the conveyor chain sprockets 306 are mounted on the clutch shaft 308 carried in bearing 318 mounted outside the casing of the machine. Shaft 308 drives a clutch generally designated 320, which in turn drives a sprocket 322. It is this sprocket which is connected by the previously mentioned local chain 316 (Fig. 6) to cam shaft 106. Referring momentarily to Fig. 9, it may be mentioned that the local drive chain meshes with sprocket wheel 324 carried by the cam shaft 106, the chain being guided by suitable idle or guide sprockets or/and wheels 326 and 328.

Clutch 320 is provided because it may be desired at times to stop the operation of the weight testing machine without, however, interrupting the continued operation of the conveyor chains. In such case, however, it is important that the weight testing machine be stopped with the load pan in lowered position, so that there will be no interference with packages moving along the conveyor. Referring to Figs. 16 through 19, the clutch comprises a crown wheel 330 forming the driving part of the clutch. The sprocket 322 is the driven part, and this carries a dog 332 pivoted on a stud 334 carried by sprocket wheel 322. The tooth of the dog is normally urged into engagement with the crown wheel by means of a pull spring 336 connected to a stud 338 also carried by sprocket 322. The normal driving relation of the parts is shown in Fig. 19.

Dog 332 is provided with a knock-out finger 340 which projects beyond the periphery of the clutch. By moving a stop 342 from the broken line position 342' to the solid line position shown in Fig. 17, the knock-out finger 340 is intercepted by the stop 342, thereby releasing clutch 320, as is shown in Fig. 18. The driven part of the clutch remains in the position shown, so that the weight testing machine always stops in a single position. When stop 342 is moved back out of the way of knock-out finger 340, the clutch is again engaged and the operation of the machine is resumed. To obtain release of the clutch at the instant the scale is in a down position, a definite relation between the position of the sprocket on the clutch shaft and the position of the sprocket on the camshaft is established before the chain is placed on the sprockets. This relative position is then maintained.

The stop 342 is mounted on an arm 344 oscillatable on a pin 346 carried by a suitable bracket 348 (Figs. 16 and 18). A control rod 350 extends upwardly from the hub 352 of arm 344 to a suitable knob 351 (Fig. 6) conveniently disposed above the top of the machine. It will be evident that by shifting the knob between one extreme position and the other, the stop 342 is moved into or out of operative position, thereby controlling the operation of the machine.

Inasmuch as the clutch operation is abrupt, I prefer to provide a slightly yieldable connection between the clutch shaft 308 and the crown wheel 330. Specifically, shaft 308 carries a flange 354 (Figs. 17 and 20) having some pins projecting therefrom through holes in leather discs 356. In the present case, there are three such pins indicated at 358 in Fig. 20. There is also a driven flange 360 (Fig. 17) having three pins 362 (Figs. 17 and 20) projecting through the leather discs 356. The holes in flange 354 at the pins 362 are enlarged, and similarly, flange 360 is provided with enlarged holes at the ends of pins 358. The holes through the leather discs are not enlarged. It will be evident that with this arrangement, the driving torque is taken through the leather discs, and the enlarged holes afford a slight amount of yield or cushioning action when the clutch is engaged.

When the machine is put out of operation, the stop and placement fingers are preferably moved to the retracted position shown in broken lines in Fig. 16 and are there held, in order not to interfere with movement of packages along the conveyor. Specifically, an angle arm 364 is pivotally mounted on top of the machine at 366. It is connected by means of a link 368 to a pusher 370 the tip of which is disposed adjacent the end of arm 258. A similar pusher 372 is located with its tip adjacent the end of arm 284. Pushers 370 and 372 are connected by a link 374. It will be evident that with the pushers in the solid line position shown in Fig. 16, there is no interference with the operation of the fingers 36 and 38. However, upon movement of angle lever 364 from the solid line position to the broken line position 364', the link 368 is moved to the broken line position 368', thereby turning the pushers to the broken line positions 370' and 372', respectively. In this position, the ends of the pushers force the arms 258 and 284 to the broken line positions 258' and 284', thereby moving the fingers to the broken line positions 36' and 38'.

This does not conflict with the action of the cams, because it moves the cam followers away from the cams. Thus the fingers might be moved to inoperative position even without stopping the machine. However, ordinarily the machine is stopped, and in the present structure, the movement of the control knob 251 for the clutch is itself used to operate the pushers 370 and 372. Specifically, the opposite end of angle lever 364 (Fig. 16) is slotted at 376 and the clutch control arm 350 passes through the slot 376. Thus movement of the rod 350 (Fig. 16) from the solid line position to the broken line position 350' shifts the linkage controlling the stop and placement fingers.

Because of the extremely uneven load during rotation of the cam shaft, I prefer to apply a friction brake to the same. Thus, referring to Fig. 6, I employ a stationary belt or band 412 engaging a pulley 380, one end of band 412 being fixed, and the other end being connected to a spring 414. The pulley 380 is more clearly shown in Fig. 9. The latter figure also shows a handwheel 386 which is convenient when adjusting the machine.

Modifications

While I have described the machine as being driven by the conveyor chains and not requiring a motor of its own, it will be understood that the machine may, if desired, be driven by a local motor. Thus, in Fig. 21, the main cam shaft 106 is provided with a sprocket 380' driven by a combined motor and reduction gear 382 through a chain 384. The sprocket 380' may correspond to the sprocket 324 shown in Fig. 9. In this case, the conveyor 388 (Fig. 21) is driven by some other source of power, as, for example, by filling or sealing machinery.

It will be understood that the conveyor 388 may, if desired, also be driven by the motor 382. In such case, it is merely necessary to pass the conveyor chain downwardly around a clutch shaft, just as was previously described, the main difference being that the clutch shaft will be driven by the cam shaft 106 instead of vice versa.

In some cases the conveyors leading to and from the weight testing machine may be in the form of wide belts rather than a pair of spaced narrow belts or chains. In such case, the spaced conveyor chains may be localized at the weight testing machine, and such an arrangement is shown in Fig. 22, in which packages are supplied by a belt conveyor 390 to a chain conveyor 392 passing over the top of the machine. The conveyor 392 may be exactly like that previously described, except that it is used only at the weight testing machine itself. The packages are delivered from the weight testing machine by another belt conveyor 394. In this case, the machine is driven by a motor 396 driving the conveyor chain 392, as by means of a belt or chain 398 connected to the shaft 308. The motor 396 may instead be connected by a belt or chain to shaft 400, as is indicated in broken lines at 402. The main cam shaft 106 is connected to the clutch shaft 308, as was previously described.

It is not essential that the load pan of the scale pass literally through the conveyor or between two conveyor chains. In referring to the load pan as passing through the conveyor, I do not mean to exclude the possibility of having it pass around the conveyor. Thus, referring to Figs. 23 and 24, the conveyor 404 is a solid belt or chain which is relatively narrow, although of adequate width to support the packages 406. The load pan 408 of the scale is bifurcated, the spaced parts 410 thereof straddling the conveyor 404. It will be evident from inspection of the drawing that when the scale is raised, the load pan will lift the package from the conveyor, and then redeposit the same when the scale is lowered, just as was previously described.

As so far described, the machine is used solely for ejecting underweight packages. For some purposes, it may be desired to eject overweight as well as underweight packages. A slightly modified arrangement for this purpose is illustrated in Figs. 26, 27 and 28.

Referring to Fig. 26 and comparing the same with Fig. 7, for example, one important difference is the addition of the contact arm 234' carrying contacts 252' for engaging spring contacts 236'. These may exactly duplicate the parts 234, 236 and 252 at the opposite end of the scale. Obviously, an overweight package will cause the added contacts to close. This will initiate operation of the ejector mechanism, as will be clear from consideration of Fig. 28, which is a wiring diagram much like that shown in Fig. 8, but differing in adding the contacts 234′, 236′, and conductors 420 and 422 in which connect the contacts 236′ in parallel with the contacts 236. It will be evident that closing of either pair of contacts will energize the magnet 230, and so release the arm 218, all as was previously explained in connection with Fig. 8.

Figs. 26 and 27 illustrate another modification or change. Sometimes it is desired to allow packages to go through the weight testing machine even though they are slightly overweight or underweight. The amounts of the excess or deficiency in weight may be alike or may be different, and only those packages whose error in weight is in excess of the allowance or "tolerances," as they are called, are to be ejected. For this purpose, I provide means to block operation of the scale so long as the weights of the packages are within the tolerances, and I permit the scale to operate normally when these limits are exceeded.

Specifically, the frame 76 of the scale is provided with outwardly projecting arms 424 and 426 (Fig. 26) which carry platforms 428 and 430 on which rest removable and interchangeable tolerance weights or poises 432 and 434. These have upwardly projecting loops of wire 436 and 438 which are received over hooks 440 and 442 projecting from the ends of the scale. The tables 428 and 430 are preferably mounted on screws 444 threadedly received in the arms 424, 426, so that their elevation may be adjusted until the loops 436 and 438 just clear the hooks 440 and 442 when the scale is balanced. The adjustment of screws 444 may be locked by means of lock nuts 446.

It will be evident that when the scale attempts to tilt, it must lift one or the other of the tolerance weights 432 and 434. The tolerance weight thus determines the tolerance or permitted inaccuracy in the package weight. In Fig. 26 the tolerance weight 432 is shown much heavier than tolerance weight 434. Such conditions are common in ordinary commercial practice, the larger weight 432 representing the overweight tolerance, and the smaller weight 434 representing the underweight tolerance. The permissible underweight is strictly limited, but the permissible overweight may be much greater because unless it is substantial, it does not pay to attempt to retrieve the excess material.

In general, a machine which shows overweights as well as underweights has an advantage even when no attempt is made to recover excess material, because it helps expose faulty operation of the package filling machine, which might otherwise produce a continuous series of overweights without detection.

It should be understood that the use of tolerance weights is not restricted to a machine which shows overweights and underweights. For example, the hook 442 and the tolerance weight 434 may be used in cooperation with the contacts 234, 236, in a machine showing only underweights. Conversely, the tolerance weight 432 and the contacts 234′, 236′, might be used in a machine showing only overweights. The advantage of using tolerance weights is that they make it possible to vary or determine the tolerance by simply changing the magnitude of the poise. In the particular form shown in Fig. 26, the tolerance weights are significant in creating a relative difference in tolerance for underweight and overweight packages, in addition to defining the tolerances in an absolute sense.

Operation

The operation of the machine may be summarized as follows. The conveyor chains 16 convey a steady stream of packages through the machine. The packages are momentarily restrained at the stop and placement fingers, but merely enough to insure proper placement of the packages on the load pan of the scale.

The conveyor chains drive the clutch shaft 308, which in turn drives the main cam shaft 106 through chain 316. The cam shaft carries a stop finger cam, a placement finger cam, a scale release switch cam, an ejector restoring or latching cam, a scale release cam, a scale lift cam, and a cylinder or ejector cam. As the cam shaft rotates, the scale is bodily lifted, following which the scale is released for tilting movement. If the package is correct in weight or over-weight, there is no contact at the scale contacts, and consequently no energization of the latch magnet and no operation of the ejector. During continued rotation of the cam shaft, the scale is lowered, and the stop fingers and placement fingers are operated in proper time to insure proper placement of the next package.

When, however, a package is underweight, the scale contacts are closed, the latch magnet energized, and the latch released, whereupon the cam follower of the cylinder cam is moved into engagement with the cam. The cam shape is such that the ejector is not operated immediately, and instead, the scale is lowered and the package redeposited on the conveyor. It is only after the package has been moved along by the conveyor to a point opposite the ejector, that the ejector functions to slide the package sidewardly off the conveyor. During continued rotation of the cam shaft, the latching or restoring cam shifts the latch arm back to latched position, thereby disengaging the cam follower from the cylinder cam.

The precision or minimum error to which the machine will respond depends on the desired speed, and also on the weight of the package to be tested. In the particular machine here illustrated, a tolerance of one-quarter ounce is allowed for a two-pound package at a speed of sixty-five packages per minute. The mass being accelerated by the error or unbalance force consists of the package being weighed, the standard weight package, and the weight of the scale beam and associated parts. In the present machine, an error of one-eighth of an ounce is enough, on theoretical computation, but due to wind resistance, friction, and other such factors, I prefer to allow a one hundred per cent safety factor, thus prescribing the error or tolerance as one-quarter ounce instead of an eighth of an ounce for a two-pound package. The distance over which the scale is moved by the accelerating force in the available time may be reduced, but, as previously pointed out, I prefer to use a minimum of one millimeter in order to insure safe opening of the scale contacts.

If the machine may be run more slowly, the measurable error may, of course, be smaller, as there is a greater time for the accelerating force to move the scale. If the package is smaller, the error may be smaller, as for example, approximately an eighth of an ounce for a one-pound package, instead of one-quarter ounce for a two-pound package. Or, instead of using a smaller error, the machine might be run faster.

For packages which are very much smaller, the machine is preferably redesigned to use an appropriately smaller and lighter scale, so that the mass of the scale will not add excessively to the mass of the packages.

It is believed that the operation as well as the many advantages of my improved weight testing machine, will be apparent from the foregoing detailed description thereof. The machine may be set under a conveyor carrying packages, and tests the weight of each package by only a momentary interruption in the progress of the package along the conveyor, and without necessitating any change in the direction of movement of the same. The underweight package is ejected from the conveyor at a later point in order to conserve all of the time available in the operating cycle of the machine. The machine operates at high speed, and may therefore be coupled directly to high speed filling and sealing machinery. There is no change in the orientation of the packages, thus adapting the machine for use with packages having an unsymmetrically located filling point. It becomes possible to test the package weight before sealing the package, so that faulty packages may be corrected. Extreme accuracy in the feeding of the packages to the conveyor is not essential, for the weight testing machine has its own mechanism for proper placement of the packages. Where a driven conveyor is already available, the conveyor may itself be used to drive the weight testing machine, thus maintaining synchronism and dispensing with the need for a special motor. The machine may be put out of operation without stopping the conveyor, and in such case the load pan and the placement fingers are all moved out of the path of the moving packages. The bearings of the scale are ball bearings instead of stones or agates, thereby avoiding any difficulty which might arise from the repeated and rather rapid raising and lowering of the scale. The scale has no restoring force or low center of gravity, and therefore weights at maximum speed, its balance position being reestablished by the scale lock fingers rather than by a gravitational restoring force.

It will be apparent that while I have shown and described my invention in preferred forms, many changes and modifications may be made in the structures disclosed, without departing from the spirit of the invention as sought to be defined in the following claims.

I claim:

1. Weight testing apparatus comprising a spaced pair of travelling conveyor chains for supporting and moving a series of objects or packages to be tested, a scale having a load pan forming a part of the scale and so dimensioned as to be capable of passing vertically between the conveyor chains, and means to periodically lift the scale with its load pan bodily until the load pan takes the weight of an object or package being carried by the conveyor chains.

2. Weight testing apparatus comprising a spaced pair of travelling conveyor chains for moving a series of objects or packages to be tested, a scale having a load pan so dimensioned as to be capable of passing vertically between the conveyor chains, means to periodically lift the scale bodily until the load pan takes the weight of an object or package being carried by the conveyor chains, and means disposed at the conveyor ahead of the scale for periodically releasing one of the objects in proper synchronism to be picked up by the load pan when the scale is lifted.

3. Weight testing apparatus comprising a spaced pair of travelling conveyor chains for moving a series of objects or packages to be tested, a scale having a load pan so dimensioned as to be capable of passing vertically between the conveyor chains, means to periodically lift the scale bodily until the load pan takes the weight of an object or package being carried by the conveyor chains, a pair of stop fingers disposed at the conveyor ahead of the scale for periodically stopping the objects from movement with the conveyor, and a pair of placement fingers between the stop fingers and the scale for periodically releasing one of the objects in proper synchronism to be picked up by the load pan when the scale is lifted.

4. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, a drive shaft for said apparatus, a clutch, a clutch release handle, and means whereby movement of said handle disengages the clutch with the scale in lowered position.

5. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, placement means disposed at the conveyor ahead of the scale for periodically releasing one of the objects in proper synchronism to be picked up by the load pan when the scale is lifted, a drive shaft for said apparatus, a clutch, a clutch release handle, and means whereby movement of said handle moves the placement means to a position outside the path of movement of the objects on the conveyor.

6. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, a pair of stop fingers disposed at the conveyor ahead of the scale for periodically stopping the objects from movement with the conveyor, a pair of placement fingers between the stop fingers and the scale for periodically releasing one of the objects in proper synchronism to be picked up by the load pan when the scale is lifted, a drive shaft for said apparatus, a clutch, a clutch release handle, and means whereby movement of said handle spreads the stop fingers and placement fingers to a position outside the path of movement of objects on the conveyor.

7. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, a pair of stop fingers disposed at the conveyor ahead of the scale for periodically stopping the objects from movement with the conveyor, a pair of placement fingers between the stop fingers and the scale for periodically releasing one of the objects in proper synchronism to be picked up by the load pan when the scale is lifted, a drive shaft for said apparatus, a clutch, a clutch release handle, means whereby movement of said handle disengages the clutch with the scale in lowered position, and means whereby movement of said handle spreads the stop fingers and placement fingers to a position outside the path of movement of objects on the conveyor.

8. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, an ejector movable transversely of the conveyor for pushing a faulty object or package off the conveyor, and means whereby said ejector is operated in response to an unbalance of the scale.

9. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, an ejector movable transversely of the conveyor for pushing a faulty object or package off the conveyor, said ejector being located at a point beyond the scale, and means whereby said ejector is operated in response to an unbalance of the scale, the operation of the ejector being so timed as to take place after completion of the weight-testing cycle and when the faulty object or package comes opposite the ejector.

10. Underweight ejector apparatus comprising a spaced pair of travelling conveyor chains for moving a series of objects or packages to be tested for underweight, a scale having a load pan so dimensioned as to be capable of passing vertically between the conveyor chains, means to periodically lift the scale bodily until the load pan takes the weight of an object or package being carried by the conveyor, an ejector movable transversely of the conveyor chains for pushing an underweight object or package off the conveyor chains, said ejector being located at a point beyond the scale, and means whereby said ejector is operated in response to an underweight on the load pan, the operation of the ejector being so timed as to take place after completion of the weight-testing cycle and when the underweight object or package comes opposite the ejector.

11. In combination, a filling machine for filling containers through an opening unsymmetrically located on the container, weight-testing apparatus, sealing mechanism for sealing the aforesaid opening in the container, conveyor means for supporting and conveying the containers from the filling means through the weight-testing apparatus to the sealing means without changing the orientation of the containers, said conveyor being so arranged that it supports the containers with a part of each container exposed at the bottom, said weight testing apparatus comprising a scale having a load pan so dimensioned as to be capable of passing transversely of the conveyor in order to engage the exposed bottom part of each container, and means to periodically lift the scale bodily until the load pan takes the weight of the container being carried by the conveyor, and to then lower the scale to replace the container on the conveyor without change in orientation of the container.

12. In combination, a filling machine for filling containers through an opening unsymmetrically located on the container, incorrect weight ejecting apparatus, sealing mechanism for sealing the aforesaid opening in the container, a spaced pair of conveyor chains for conveying the containers from the filling means through the weight testing apparatus to the sealing means without changing the orientation of the containers, said incorrect weights ejecting mechanism comprising a scale having a load pan so dimensioned as to be capable of passing vertically between the conveyor chains, and means to periodically lift the scale bodily until the load pan takes the weight of an object or package being carried by the conveyor.

13. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, placement means disposed at the conveyor ahead of the scale for restraining but periodically releasing one of the objects in proper synchronism to be picked up by the load pan when the scale is lifted, and an ejector movable transversely of the conveyor for pushing a faulty object or package off the conveyor.

14. Apparatus as defined in claim 13, in which the apparatus is driven by the conveyor itself, thereby maintaining proper synchronism between the movement of the conveyor and the operation of the weight testing apparatus.

15. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, placement means disposed at the conveyor ahead of the scale for restraining but periodically releasing one of the objects in proper synchronism to be picked up by the load pan when the scale is lifted, an ejector movable transversely of the conveyor for pushing a faulty object or package off the conveyor, a drive shaft for said apparatus, a clutch, a clutch release handle, and means whereby movement of said handle disengages the clutch with the scale in lowered position.

16. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, placement means disposed at the conveyor ahead of the scale for restraining but periodically releasing one of the objects in proper synchronism to be picked up by the load pan when the scale is lifted, an ejector movable transversely of the conveyor for pushing a faulty object or package off the conveyor, a drive shaft for said apparatus, a clutch, a clutch release handle, and means whereby movement of the handle retracts the placement means to a position outside the path of movement of objects on the conveyor.

17. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, placement means disposed at the conveyor ahead of the scale for restraining but periodically releasing one of the objects in proper synchronism to be picked up by the load pan when the scale is lifted, an ejector movable transversely of the conveyor for pushing a faulty object or package transversely off the conveyor, a drive shaft for said apparatus, a clutch, a clutch release handle, means whereby movement of said handle disengages the clutch with the scale in lowered position, and means whereby movement of the handle retracts the placement means to a position outside the path of movement of objects on the conveyor.

18. Weight testing apparatus comprising a travelling conveyor for moving a series of objects or packages to be tested, a scale having a load pan so dimensioned as to be capable of passing vertically through the conveyor, means to periodically lift the scale bodily until the load pan takes the weight of an object or package being carried by the conveyor, a pair of stop fingers disposed at the conveyor ahead of the scale for periodically stopping the objects from movement with the conveyor, a pair of placement fingers between the stop fingers and the scale for periodically releasing one of the objects in proper synchronism to be picked up by the load pan when the scale is lifted, an ejector movable transversely of the conveyor for pushing an incorrect weight object or package off the conveyor, said ejector being located at a point beyond the scale, and means whereby said ejector is operated in response to an incorrect weight on the load pan, the operation of the ejector being so timed as to take place after completion of the weight-testing cycle and when the incorrect weight object or package comes opposite the ejector.

19. Weight testing apparatus comprising a travelling conveyor for moving a series of objects or packages to be tested, a scale having a load pan so dimensioned as to be capable of passing vertically through the conveyor, means to periodically lift the scale bodily until the load pan takes the weight of an object or package being carried by the conveyor, a pair of stop fingers disposed at the conveyor ahead of the scale for periodically stopping the objects from movement with the conveyor, a pair of placement fingers between the stop fingers and the scale for periodically releasing one of the objects in proper synchronism to be picked up by the load pan when the scale is lifted, an ejector movable transversely of the conveyor for pushing an incorrect weight object or package off the conveyor, said ejector being located at a point beyond the scale, means whereby said ejector is operated in response to an incorrect weight on the load pan, the operation of the ejector being so timed as to take place after completion of the weight-testing cycle and when the incorrect weight object or package comes opposite the ejector, a drive shaft for said apparatus, a clutch, a clutch release handle, and means whereby movement of said handle disengages the clutch with the scale in lowered position.

20. Weight testing apparatus comprising a travelling conveyor for moving a series of objects or packages to be tested, a scale having a load pan so dimensioned as to be capable of passing vertically through the conveyor, means to periodically lift the scale bodily until the load pan takes the weight of an object or package being carried by the conveyor, a pair of stop fingers disposed at the conveyor ahead of the scale for periodically stopping the objects from movement with the conveyor, a pair of placement fingers between the stop fingers and the scale for periodically releasing one of the objects in proper synchronism to be picked up by the load pan when the scale is lifted, an ejector movable transversely of the conveyor for pushing an incorrect weight object or package off the conveyor, said ejector being located at a point beyond the scale, means whereby said ejector is operated in response to an incorrect weight on the load pan, the operation of the ejector being so timed as to take place after completion of the weight-testing cycle and when the incorrect weight object or package comes opposite the ejector, a drive shaft for said apparatus, a clutch, a clutch release handle, and means whereby movement of said handle spreads the stop fingers and placement fingers to a position outside the path of movement of objects on the conveyor.

21. Weight testing apparatus comprising a travelling conveyor for moving a series of objects or packages to be tested, a scale having a load pan so dimensioned as to be capable of passing vertically transversely through the conveyor, means to periodically lift the scale bodily until the load pan takes the weight of an object or package being carried by the conveyor, a pair of stop fingers disposed at the conveyor ahead of the scale for periodically stopping the objects from movement with the conveyor, a pair of placement fingers between the stop fingers and the scale for periodically releasing one of the objects in proper synchronism to be picked up by the load pan when the scale is lifted, an ejector movable transversely of the conveyor for pushing an incorrect weight object or package transversely off the conveyor, said ejector being located at a point beyond the scale, means whereby said ejector is operated in response to an incorrect weight on the load pan, the operation of the ejector being so timed as to take place after completion of the weight-testing cycle and when the incorrect weight object or package comes opposite the ejector, a drive shaft for said apparatus, a clutch, a clutch release handle, and means whereby movement of said handle disengages the clutch with the scale in lowered position, and additional means whereby movement of said handle spreads the stop fingers and placement fingers to a position outside the path of movement of objects on the conveyor.

22. In combination, a filling machine for filling containers through an opening unsymmetrically located on the container, weight testing apparatus, and sealing mechanism for sealing the aforesaid openings in the container, conveyor means for conveying the containers from the filling means through the weight testing apparatus to the sealing means without changing the orientation of the containers, said weight testing apparatus comprising a scale having a load pan so dimensioned as to be capable of passing transversely of the conveyor, means to periodically lift the scale bodily until the load pan takes the weight of a container being carried by the conveyor, placement means disposed at the conveyor ahead of the scale for periodically releasing one of the containers in proper synchronism to be picked up by the load pan when the scale is lifted, and an ejector movable transversely of the conveyor for pushing a faulty container transversely off the conveyor.

23. In combination, a filling machine for filling containers through an opening unsymmetrically located on the container, incorrect weight ejecting apparatus, a sealing mechanism for sealing the aforesaid openings in the container, conveyor means for conveying the containers from the filling means through the incorrect weight ejecting apparatus to the sealing means without changing the orientation of the containers, said incorrect weight ejecting apparatus comprising a scale having a load pan so dimensioned as to be capable of passing vertically through the conveyor, means to periodically lift the scale bodily until the load pan takes the weight of a container being carried by the conveyor, a pair of stop fingers disposed at the conveyor ahead of the scale for periodically stopping the container from movement with the conveyor, a pair of placement fingers between the stop fingers and the scale for periodically releasing one of the containers in proper synchronism to be picked up by the load pan when the scale is lifted, an ejector movable transversely of the conveyor for pushing an incorrect weight container off the conveyer, said ejector being located at a point beyond the scale, and means whereby said ejector is operated in response to an incorrect weight on the load pan, the opertation of the ejector being so timed as to take place after completion of the weight-testing cycle and when the incorrect weight container comes opposite the ejector.

24. Weight-testing apparatus comprising a travelling conveyor for moving a series of objects or packages to be tested, a scale having a load pan so dimensioned as to be capable of passing transversely of the conveyor, said scale including a tolerance poise to determine the tolerance or error permissible before tilting of the scale, and means to periodically lift the scale including the tolerance poise bodily until the load pan takes the weight of an object or package being carried by the conveyor, and to then lower the scale to replace the object or package on the conveyor.

25. Weight testing apparatus comprising a travelling conveyor for moving a series of objects or packages to be tested, a scale having a load pan so dimensioned as to be capable of passing transversely of the conveyor, means to periodically lift the scale bodily until the load pan takes the weight of an object or package being carried by the conveyor, and to thereafter lower the scale to again place the object or package on the conveyor, an ejector movable transversely of the conveyor for pushing a faulty object or package off the conveyor, and means whereby said ejector is operated in response to an unbalance of the scale caused by either underweight or overweight of the object or package being tested.

26. Weight testing apparatus comprising a travelling conveyor for moving a series of objects or packages to be tested, a scale including a main support frame, a scale beam pivoted thereon, a standard weight pan, a load pan so dimensioned as to be capable of passing transversely of the conveyor, tolerance poise supporting arms at the ends of the frame, tolerance poises carried thereby, hooks projecting from the ends of the scale and movable with the scale beam for lifting one or the other of the poises when the scale is tilted, and means to periodically lift the scale supporting frame together with all of the aforesaid scale parts bodily until the load pan takes the weight of an object or package being carried by the conveyor, and to thereafter lower the frame to again place the object or package on the conveyor.

27. Weight testing apparatus comprising a travelling conveyor for moving a series of objects or packages to be tested, a scale including a main support frame, a scale beam pivoted thereon, a standard weight pan, a load pan so dimensioned as to be capable of passing transversely of the conveyor, stationary contacts carried by the frame at the ends of the scale, movable contacts at the ends of the scale arranged for movement with the beam, and means to periodically lift the scale supporting frame with all of the scale parts bodily until the load pan takes the weight of an object or package being carried by the conveyor, and to thereafter lower the frame to again place the objects or package on the conveyor, and ejector means responsive to closing of the aforesaid contacts.

28. Weight testing apparatus comprising a travelling conveyor for moving a series of objects or packages to be tested, a scale including a main support frame, a scale beam pivoted thereon, a standard weight pan, a load pan so dimensioned as to be capable of passing transversely of the conveyor, stationary contacts carried by the frame at the ends of the scale, movable contacts at the ends of the scale arranged for movement with the beam, tolerance poise supporting arms at the ends of the frame, tolerance poises carried thereby, hooks projecting from the ends of the scale and movable with the scale beam for lifting one or the other of the poises when the scale is tilted, means to periodically lift the scale supporting frame together with all of the aforesaid scale parts bodily until the load pan takes the weight of an object or package being carried by the conveyor, and to thereafter lower the frame to again place the object or package on the conveyor, and ejector means responsive to closing of the aforesaid contacts.

29. Weight-testing apparatus comprising a continuously travelling conveyor for supporting and moving a series of objects or packages to be tested with a part of each object or package exposed at the bottom, a scale having a load pan so dimensioned as to be capable of passing transversely of the conveyor in order to engage the exposed part of the object or package, and means to periodically lift the scale bodily until the load pan takes the weight of the moving object or package, and thereby arrests its movement for the weighing operation despite the continuous movement of the conveyor.

30. Weight-testing apparatus comprising a continuously travelling conveyor for supporting and moving a series of objects or packages to be tested with a part of each object or package exposed at the bottom, a scale having a load pan so dimensioned as to be capable of passing transversely of the conveyor in order to engage the exposed part of the object or package, and means to periodically lift the scale bodily until the load pan takes the weight of the moving object or package and thereby arrests its movement, said scale having widely spaced pairs of scale bearings which are anti-friction ball bearings incapable of being dislodged by the brake action exerted by the scale pan on the moving object or package.

31. Weight testing apparatus comprising a travelling conveyor for moving a series of objects or packages to be tested, said conveyor including a long continuous band carried at its ends on wheels having fixed axes, a scale having a load pan forming a part of the scale and so dimentioned as to be capable of passing transversely of the conveyor in a vertical direction, and means to periodically lift the scale with its load pan bodily until the load pan takes the weight of an object or package being carried by the conveyor.

32. Apparatus as defined in claim 30, in which the scale lifting and weighing apparatus is driven by the conveyor itself, thereby maintaining proper synchronism between the movement of the conveyor and the operation of the weight testing machine.

33. Weight testing apparatus comprising a travelling conveyor for supporting and moving a series of objects or packages to be tested with a part of each object or package exposed at the bottom, said conveyor including a long continuous band carried at its ends on wheels having fixed axes, a scale having a load pan so dimensioned as to be capable of passing transversely of the conveyor in a vertical direction in order to engage the exposed part of the bottom of the object or package, means to periodically lift the scale bodily until the load pan takes the weight of an object or package being carried by the conveyor, and means disposed at the conveyor ahead of the scale for periodically releasing one of the objects in proper synchronism to be picked up by the load pan when the scale is lifted.

34. Weight testing apparatus comprising a travelling conveyor for supporting and moving a series of objects or packages to be tested with a part of each object or package exposed at the bottom, said conveyor including a long continuous band carried at its ends on wheels having fixed axes, a scale having a load pan so dimensioned as to be capable of passing transversely of the conveyor in a vertical direction in order to engage the exposed part of the bottom of the object or package, means to periodically lift the scale bodily until the load pan takes the weight of an object or package being carried by the conveyor, a pair of stop fingers disposed at the conveyor ahead of the scale for periodically stopping the objects from movement with the conveyor, and a pair of placement fingers between the stop fingers and the scale for periodically releasing one of the objects in proper synchronism to be picked up by the load pan when the scale is lifted.

FRITZ P. MANSBENDEL.